United States Patent
Muthiah

(10) Patent No.: US 12,153,831 B2
(45) Date of Patent: Nov. 26, 2024

(54) ACCELERATOR QUEUE IN DATA STORAGE DEVICE

(71) Applicant: Western Digital Technologies, Inc., San Jose, CA (US)

(72) Inventor: Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 41 days.

(21) Appl. No.: 17/941,664

(22) Filed: Sep. 9, 2022

(65) Prior Publication Data

US 2024/0086106 A1  Mar. 14, 2024

(51) Int. Cl.
*G06F 3/06* (2006.01)

(52) U.S. Cl.
CPC .......... *G06F 3/0659* (2013.01); *G06F 3/0619* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595;

(Continued)

(56) References Cited

U.S. PATENT DOCUMENTS 8,595,385 B1 * 11/2013 Shapiro ................. G06F 13/385
710/52
8,887,174 B2 * 11/2014 Hankins .............. G06F 11/3466
719/318

(Continued)

OTHER PUBLICATIONS

L. Kohutka, L. Nagy and V. Stopjaková, "A Novel Hardware-Accelerated Priority Queue for Real-Time Systems," 2018 21st Euromicro Conference on Digital System Design (DSD), Prague, Czech Republic, 2018, pp. 46-53, doi: 10.1109/DSD.2018.00023. (Year: 2018).*

(Continued)

*Primary Examiner* — Daniel C. Chappell
(74) *Attorney, Agent, or Firm* — Morgan, Lewis & Bockius LLP

(57) ABSTRACT

Disclosed are systems and methods for accelerating commands from accelerators in data storage devices using accelerator queues. A data storage device includes accelerator interfaces, each accelerator interface couples a controller to a respective accelerator. The device also includes a device memory comprising one or more memories and one or more sets of queues. Each set of queues corresponds to a respective memory, at least one queue is configured to queue one or more tasks associated with an accelerator, and each queue is associated with a respective priority level of a plurality of priority levels. A controller is configured to: receive an accelerator command, identify a first memory corresponding to a task for the accelerator command; and enqueue the task to a first queue corresponding to the first memory, the first queue configured to queue one or more tasks associated with the first accelerator corresponding to the first accelerator interface.

19 Claims, 4 Drawing Sheets

(58) Field of Classification Search
CPC ...... G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| | | | |
|---|---|---|---|
| 10,453,540 | B2 | 10/2019 | Guo et al. |
| 10,459,644 | B2 | 10/2019 | Mehra et al. |
| 10,656,872 | B2 | 5/2020 | Gavens et al. |
| 10,776,263 | B2 | 9/2020 | Williams |
| 10,956,346 | B1 | 3/2021 | Ben-Yehuda et al. |
| 2002/0143847 | A1* | 10/2002 | Smith ................ G06F 9/4881 718/103 |
| 2011/0102443 | A1* | 5/2011 | Dror .................. G06T 1/20 345/522 |
| 2012/0194525 | A1* | 8/2012 | Hartog ............... G06F 9/4881 345/503 |
| 2013/0232495 | A1* | 9/2013 | Rossbach ........... G06F 9/5044 718/102 |
| 2015/0007182 | A1 | 1/2015 | Rossbach et al. |
| 2015/0279090 | A1* | 10/2015 | Keramidas .......... G06T 15/005 345/505 |
| 2015/0309846 | A1* | 10/2015 | Prasad ............... G06F 9/522 345/522 |
| 2016/0098306 | A1 | 4/2016 | Chang et al. |
| 2017/0075572 | A1 | 3/2017 | Utevsky et al. |
| 2019/0272123 | A1* | 9/2019 | Gissin ............... G06F 3/0659 |
| 2020/0183686 | A1 | 6/2020 | Healy et al. |
| 2020/0201797 | A1 | 6/2020 | Vu et al. |
| 2021/0132858 | A1* | 5/2021 | Kamran ............. G06F 3/061 |
| 2021/0191728 | A1 | 6/2021 | Ahn et al. |

OTHER PUBLICATIONS

N. Baudis et al., "Performance Evaluation of Priority Queues for Fine-Grained Parallel Tasks on GPUs," 2017 IEEE 25th International Symposium on Modeling, Analysis, and Simulation of Computer and Telecommunication Systems (Mascots), Banff, AB, Canada, 2017, pp. 1-11, doi: 10.1109/MASCOTS.2017.15. (Year: 2017).*

C. Gao, F. Baig, H. Vo, Y. Zhu and F. Wang, "Accelerating Cross-Matching Operation of Geospatial Datasets using a CPU-GPU Hybrid Platform," 2018 IEEE International Conference on Big Data (Big Data), Seattle, WA, USA, 2018, pp. 3402-3411, doi: 10.1109/BigData.2018.8622600. (Year: 2018).*

* cited by examiner

ACCELERATOR QUEUE IN DATA STORAGE DEVICE

BACKGROUND

Semiconductor memory devices, including flash memory, typically utilize memory cells to store data as an electrical value, such as an electrical charge or voltage. A flash memory cell, for example, includes a transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. Increases in storage density have been facilitated in various ways, including increasing the density of memory cells on a chip enabled by manufacturing developments, and transitioning from single-level flash memory cells to multi-level flash memory cells, so that two or more bits can be stored by each flash memory cell.

Non-volatile semiconductor memory is used in solid state drives (SSDs). As Internet-scale services continue to grow, real time data processing and data analytics by ad-hoc queries on large volumes of data is emerging as a critical application. Additionally, as memory density continues to scale, SSD capacities continue to scale exponentially. Current enterprise systems are ill-equipped to manage these trends as they rely on moving huge volumes of data out of the SSD and into a host system's main memory for processing. These solutions rely on storing data at one location (e.g., a storage device like an SSD) and move the data to a different location (e.g., a dynamic random access memory (DRAM) of the host) for computation. While this method works for some applications with limited data sizes, applications with large scale data cannot use this method because of the time wasted on transferring data and the prohibitively high cost and power consumption of including large scale (e.g., petabyte) DRAM capacity in such systems.

A memory system may accelerate performance of big data applications using a hardware accelerator based approach that involves integrating compute engines inside the memory system to perform common data manipulation operations, such as scan, filter, aggregate, join and other operations. Application programming interfaces (APIs) can be exposed by the memory system (e.g., exposed by a controller) and used by the host application to perform efficient data processing using the compute engines in the memory system.

Accelerator computations and memory access patterns and requirements differ considerably from traditional host memory accesses. Different accelerators may have different memory footprints and bandwidth requirements. Conventional SSDs fail to support the diversity and/or capabilities of accelerators. There is a need for providing better bandwidth control for compute accelerators.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

The accompanying drawings, which are included to provide a further understanding of the disclosure, are incorporated in and constitute a part of this disclosure, illustrate embodiments of the disclosure, and together with the description serve to explain principles of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present description relates in general to data storage systems and methods, and more particularly to, for example, without limitation, accelerator queues in a storage device.

Figure 1:
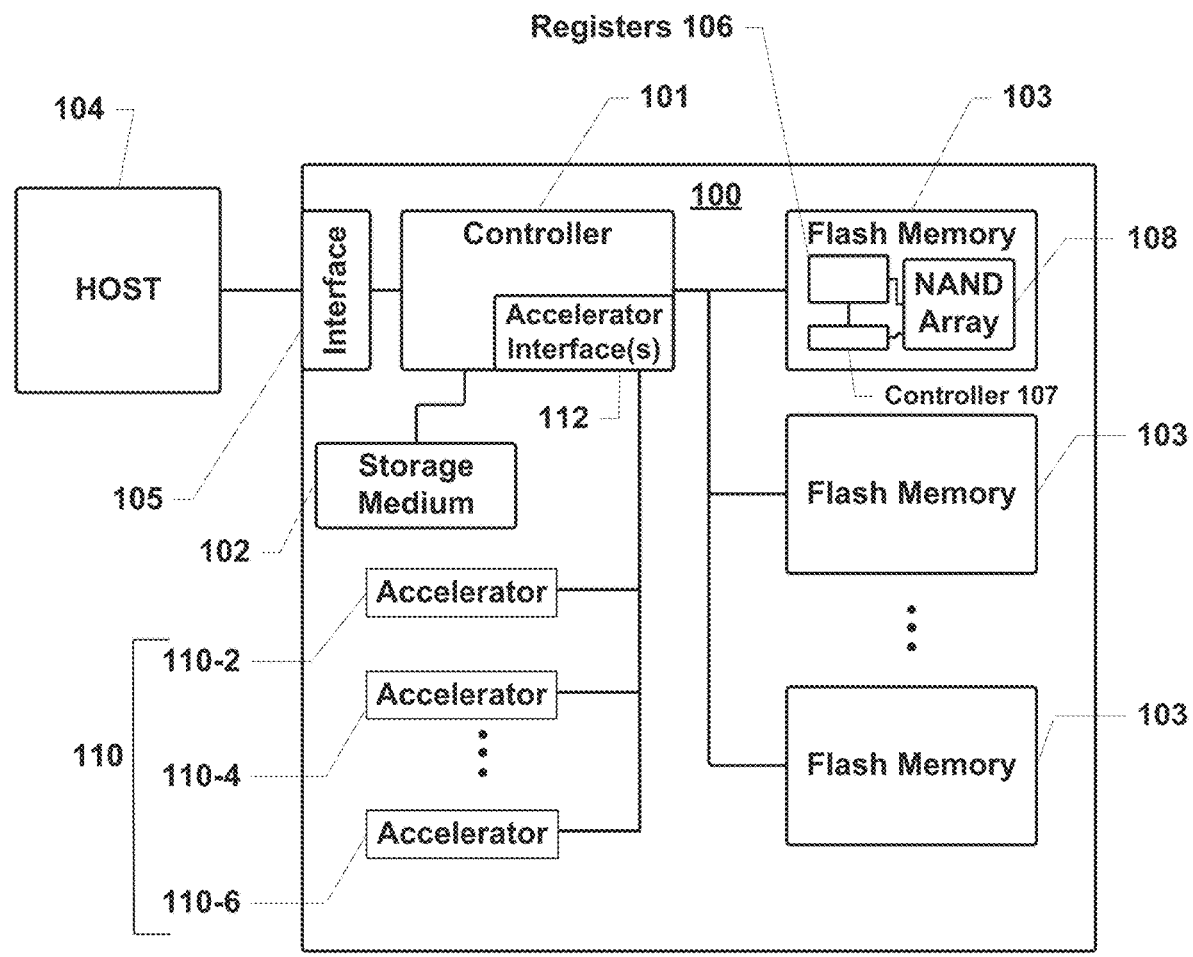
FIG. 1 is a block diagram illustrating components of an example data storage system, according to one or more embodiments.
Figure 2A:
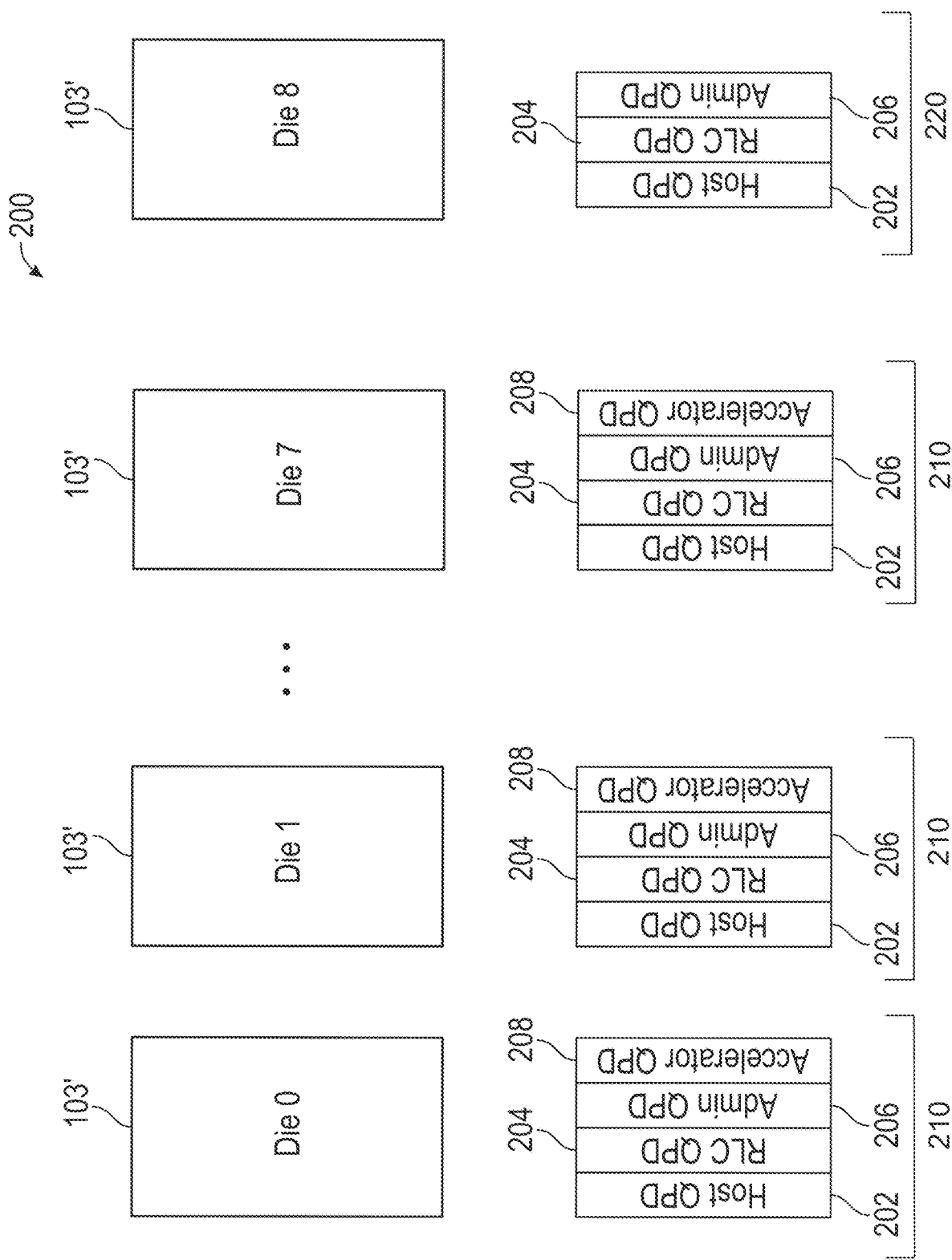
FIGS. 2A and 2B are schematic diagrams of an example memory system using accelerator queues, according to one or more embodiments.
Figure 2B:
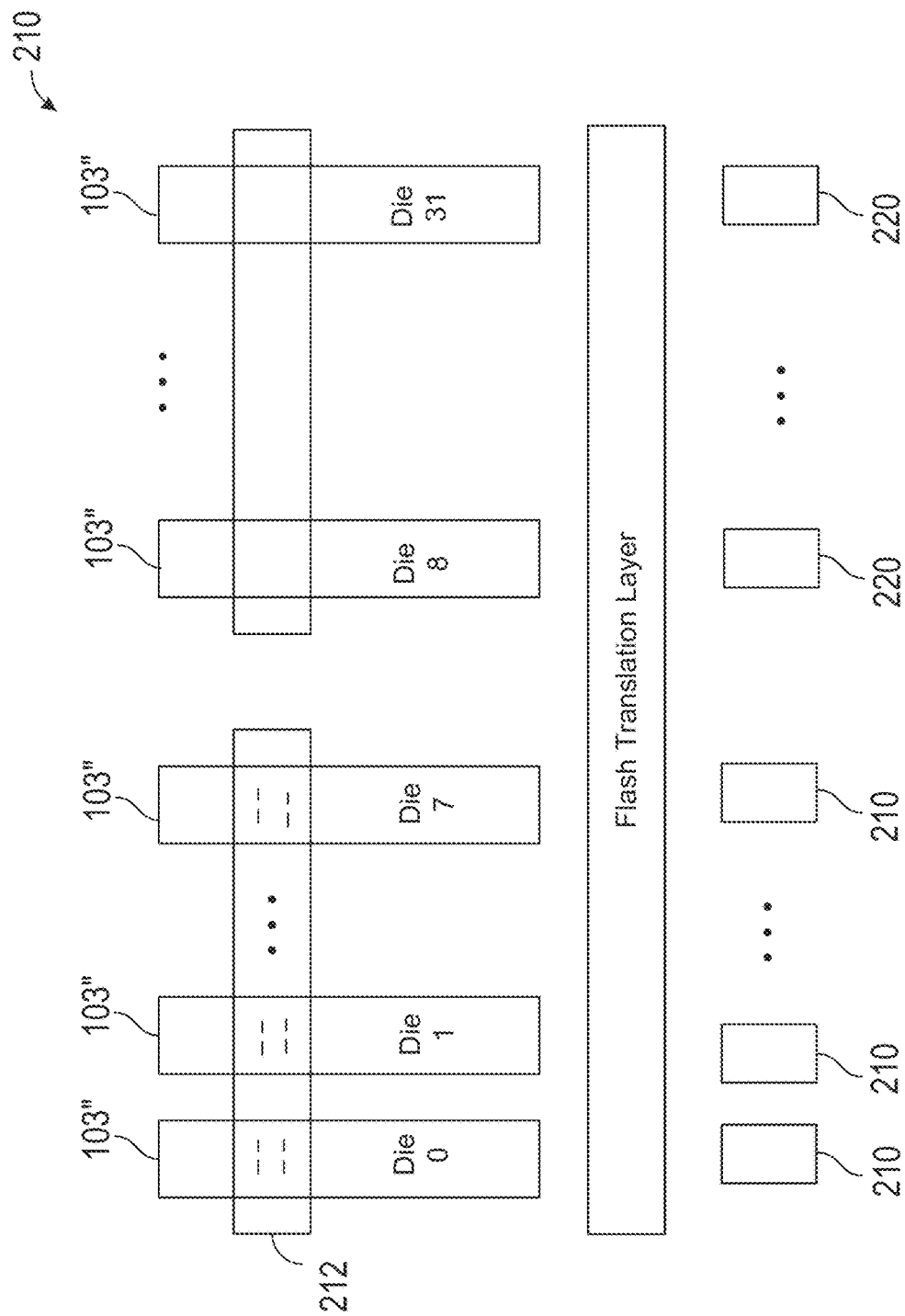

FIG. 1 is a block diagram illustrating components of an example data storage system, according to aspects of the subject technology. As depicted in FIG. 1, in some aspects, a data storage system 100 (e.g., a solid state drive (SSD)) includes a data storage controller 101, a storage medium 102, and a flash memory array including one or more flash memory 103 (or 103' or 103" as shown in FIG. 2A or 2B). The data storage controller 101 may be sometime referred to as a controller. A controller may include one or more controllers. The controller 101 may use the storage medium 102 for temporary storage of data and information used to manage the data storage system 100. The controller 101 may include several internal components (not shown), such as a read-only memory, other types of memory, a flash component interface (e.g., a multiplexer to manage instruction and data transport along a serial connection to the flash memory 103, 103' or 103"), an input/output (I/O) interface, error correction circuitry, and the like. In some aspects, all of these elements of the controller 101 may be integrated into a single chip. In other aspects, these elements may be separated on their own personal computer (PC) board.

In some aspects, one or more accelerators 110 may be coupled to the controller 101. In some aspects, the one or more accelerators 110 may be integrated within the controller 101. In some aspects, the one or more accelerators 110 may be controlled by different controllers (e.g., a controller similar to but separate from the controller 101). As compute operations move closer to the data, the available compute-to-data bandwidth increases significantly. For example, compared to conventional systems where compute is located on the host side of the input/output (I/O) interface (and outside the SSD), integrating the compute engine (sometimes called an accelerator) within an SSD can provide 1.5 to 3.75 times higher bandwidth, even as not-and (NAND) architecture and I/O interfaces continue to scale. Similarly, even closer integration (e.g., integrating the compute engine within a memory die) may provide an additional 2.5 to 13 times increase in bandwidth available to the compute engine in NAND architecture, with the adoption of advanced packaging techniques. A compute engine is a hardware circuit that can be a hardware accelerator for data access and manipulation operations such as filtering, aggregation, compression or decompression, sorting, grouping, and joining tabular or other forms of data. An accelerator may be an example of a compute engine. An accelerator may be, for example, a central processing unit (CPU) core, such as ARM/ARC/Intel Atom, or reconfigurable hardware circuitry, such as field programmable gate arrays (FPGAs).

Unlike other components in an SSD that primarily facilitate reading/writing data from/to the flash memory, a compute engine, such as an accelerator, may manipulate the contents of the data. For example, a compute engine, such as an accelerator, can search a stream of data to locate a specific key (a set of bytes) or can sort the data in some order as specified by the host. The concept of compute engines includes but is not limited to compression/decompression engines sometimes available in SSDs.

In some embodiments, aspects of the subject disclosure may be implemented in the data storage system 100. For example, aspects of the subject disclosure may be integrated with the function of the data storage controller 101 or may be implemented as separate components for use in conjunction with the data storage controller 101.

The controller 101 may include a processor that may be configured to execute code or instructions to perform the operations and functionality described herein, manage request flow and address mappings, and to perform calculations and generate commands. The processor of the controller 101 may be configured to monitor and/or control the operation of the components in the data storage controller 101. A processor may be a microprocessor, a microcontroller, or a digital signal processor (DSP). A processor may be implemented using, for example, an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101 and/or its processor. One or more sequences of instructions may be software stored and read from the storage medium 102, the flash memory 103 (or 103' or 103"), or received from a host device 104 (e.g., via a host interface 105). ROM, the storage medium 102, and the flash memory 103 (or 103' or 103"), represent examples of machine or computer readable media on which instructions/code executable by the controller 101 and/or its processor may be stored. Machine or computer readable media may generally refer to any medium or media used to provide instructions to the controller 101 and/or its processor, including volatile media, such as dynamic memory used for the storage media 102 or for buffers within the controller 101, and non-volatile media, such as electronic media, optical media, and magnetic media. A media may be a non-transitory media.

In one or more examples, an accelerator (e.g., 110-2, 110-4, or 110-6) may be a controller, such as a processor or a sub-processor.

In some aspects, the controller 101 may be configured to store data received from the host device 104 in the flash memory 103 (or 103' or 103") in response to a write command from the host device 104. The controller 101 is further configured to read data stored in the flash memory 103 (or 103' or 103") and to transfer the read data to the host device 104 in response to a read command from the host device 104. A host device 104 may be sometimes referred to as a host or a host system.

The host device 104 represents any device configured to be coupled to the data storage system 100 and to store data in the data storage system 100. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some aspects, the storage medium 102 represents volatile memory used to temporarily store data and information used to manage the data storage system 100. According to aspects of the subject technology, the storage medium 102 is random access memory (RAM), such as double data rate (DDR) RAM. Other types of RAM may be also used to implement the storage medium 102. The memory 102 may be implemented using a single RAM module or multiple RAM modules. While the storage medium 102 is depicted as being distinct from the controller 101, those skilled in the art will recognize that the storage medium 102 may be incorporated into the controller 101 without departing from the scope of the subject technology. Alternatively, the storage medium 102 may be a non-volatile memory, such as a magnetic disk, flash memory, peripheral SSD, and the like.

As further depicted in FIG. 1, the data storage system 100 may also include the host interface 105. The host interface 105 may be configured to be operably coupled (e.g., by wired or wireless connection) to the host device 104, to receive data from the host device 104 and to send data to the host device 104. The host interface 105 may include electrical and physical connections, or a wireless connection, for operably coupling the host device 104 to the controller 101 (e.g., via the I/O interface of the controller 101). The host interface 105 may be configured to communicate data, addresses, and control signals between the host device 104 and the controller 101. Alternatively, the I/O interface of the controller 101 may include and/or be combined with the host interface 105. The host interface 105 may be configured to implement a standard interface, such as a small computer system interface (SCSI), a serial-attached SCSI (SAS), a fibre channel interface, a peripheral component interconnect express (PCIe), a serial advanced technology attachment (SATA), a universal serial bus (USB), or the like. The host interface 105 may be configured to implement only one interface. Alternatively, the host interface 105 (and/or the I/O interface of controller 101) may be configured to implement multiple interfaces, which may be individually selectable using a configuration parameter selected by a user or programmed at the time of assembly. The host interface 105 may include one or more buffers for buffering transmissions between the host device 104 and the controller 101.

The flash memory 103 (or 103' or 103") may represent a non-volatile memory device for storing data. According to aspects of the subject technology, the flash memory 103 (or 103' or 103") includes, for example, a NAND flash memory. The flash memory 103 (or 103' or 103") may include a single flash memory device or chip, or (as depicted in FIG. 1) may include multiple flash memory devices or chips arranged in multiple channels. The flash memory 103 (or 103' or 103") is not limited to any particular capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 103 (or 103' or 103") is used to access one or more internal registers 106 and an internal flash controller 107 for communication by external devices (e.g., the controller 101). In some aspects, the registers 106 may include address, command, and/or data registers, which internally retrieve and output the necessary data to and from a NAND memory cell array 108. A NAND memory cell array 108 may be sometimes referred to as a NAND array, a memory array, or a NAND. For example, a data register may include data to be stored in the memory array 108, or data after a fetch from the memory array 108 and may also be used for temporary data storage and/or act like a buffer. An address register may store the memory address from which data will be fetched to the host device 104 or the address to which data will be sent and stored. In some aspects, a command register is included to control parity, interrupt control, and the like. In some aspects, the internal flash controller 107 is accessible via a control register to control the general behavior of the flash memory 103 (or 103' or 103"). The internal flash controller 107 and/or the control register may control the number of stop bits, word length, receiver clock source, and may also control switching the addressing mode, paging control, coprocessor control, and the like.

In some aspects, the registers 106 may also include a test register. The test register may be accessed by specific addresses and/or data combinations provided at the interface of flash memory 103 (or 103' or 103") (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the flash memory 103 (or 103' or 103") (e.g., read levels) to dynamically vary how data is read from the memory cells of the memory arrays 108. The registers 106 may also include one or more data latches coupled to the flash memory 103 (or 103' or 103").

It should be understood that in all cases data may not always be the result of a command received from the host 104 and/or returned to the host 104. In some aspects, the controller 101 may be configured to execute a read operation independent of the host 104 (e.g., to verify read levels or a bit error rate (BER)). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

FIG. 2A is a schematic diagram of a memory system 200, according to some embodiments.

Each die or flash memory 103, 103' or 103" (e.g., die 0, die 1, . . . , die 8) may be associated with one or more queues stored in a memory (such as a RAM) of the controller 101. Queue per die (QPD) is a queue where the tasks related to a particular die in a storage device is queued. In some aspects, sets of QPDs (e.g., 210 and 220), including one or more QPDs (e.g., 202, 204, 206 or 208), may be stored in the storage medium 102, where the storage medium 102 may be located outside of or within the controller 101.

A backend of the controller may segregate the high-level tasks to smaller units (at die or plane level) and pushes corresponding tasks to those queues of each plane/die. Thus, a large flash translation layer (FTL) command may be broken down into multiple QPD tasks across multiple dies. Typically, the FTL handles the storage part of firmware (sometimes called the controller). The FTL handles logical-to-physical (L2P) mapping, RAM sharing and management, host writes, relocation (RLC) and block management among other tasks. The FTL may further handle resource sharing and triggers backend requests consistent with storage design principles. In one or more examples, the controller 101 may perform the FTL tasks, commands and/or functions. In one or more examples, the controller 101 may include the FTL, a FTL system and/or FTL modules by having or storing FTL instructions that can be executed by the controller 101.

QPD tasks vary and the controller may have one or more priority QPDs for prioritizing those requests. For example, FIG. 2A shows a host QPD 202, relocation (RLC) QPD 204 and admin QPD 206 for administrative commands from a host. The different QPDs provide better control to the FTL to tune the ratio (priority among queues) and optimize performance.

As described above, the storage device 100 may be used for compute owing to closeness to the data. Multiple data accelerators (e.g., accelerator 110-2, accelerator 110-4, accelerator 110-6) may be present in a device SoC in an SSD. Although FIG. 1 shows only three accelerators, any number of accelerators may be disposed in a data storage device. The accelerators are other clients, much like external hosts which need a share of the device resources in read/write of data corresponding to the compute. With ever increasing compute in storage requirements, both data (FTL) and processing (accelerator component) share space. Described herein are techniques for accommodating and/or prioritizing requests from the accelerator(s).

In some aspects, the storage device 100 may include an accelerator QPD 208 for a die or plane and use that queue to submit die level compute tasks associated with one or more accelerators that reside in storage SoC as clients. The system may have multiple QPDs for multiple accelerators based on product requirements. For example, an accelerator analyzing objects in a video frame may submit frame requests, and those requests are queued as accelerator QPD entries. In one or more advantageous aspects, having separate QPDs for accelerators provide improved access to memory for accelerators. As described above, accelerator computations and memory access patterns and requirements differ considerably from traditional host memory accesses (and storage device internal memory operations). Different accelerators may have different memory footprints and bandwidth requirements. Conventional SSDs fail to support the diversity and/or capabilities of accelerators. The techniques described herein can advantageously provide better bandwidth control for compute accelerators.

In some aspects, the controller 101 may dynamically modify the priority of the accelerator QPD 208 of any die based on accelerator data bandwidth requirement and the state machine of the storage functions. For example, two accelerators, one performing object analysis on video frame at one frequency and another performing post processing of frames at another frequency would need different data bandwidth and may have different accelerator QPDs operating at different priorities. That is, the controller 101 may define multiple priority for one or more QPDs per die associated with different accelerators based on pre-agreed compute requirements.

In some aspects, the queue-based mechanism may allow the FTL system to be separated from the low-level die layers, since the FTL can queue the tasks in non-blocking modes (e.g., multiple requests may be queued for multiple dies) and additional biasing (or prioritization) may be defined at the QPD. For example, a FTL module may queue both host and RLC tasks in some proportion, and the dies 103, 103' or 103" may apply QPD weights to different QPD based on product use cases. In systems with compute accelerators, the compute tasks are independent of storage tasks, such as host requests and RLC.

In some aspects, a firmware associated with the accelerators may trigger memory requests based on the accelerator's requirement and workload. Having an accelerator QPD enables a better control over the compute requests. In some aspects, the controller 101 may dynamically raise or lower the QPD priority of the compute queue associated with one or more dies based on the accelerator state machine or based upon their operational state. For example, a long pending NAND transaction or a burst state related to a compute may be cleared based on a token from the accelerator. Some accelerators having high data throughput requirement may always have a higher QPD priority. Some of these parameters may be adjusted based on storage state machine, such as while handling a failure condition or an urgent relocation condition. For example, storage systems may need to deal with exception handling, such as program failure handling (when writes to NAND fails) and read error handling (when read from NAND fails). During this time, the resources of the system may be held up. This is an example scenario when the system would need more resources for a period of time, during which compute cores may need to wait for the resources. In some aspects, storage resources may be configured synchronous with accelerators. For example, when the storage resources are used for streaming data, and computation is performed on such streaming data, then the computations may need to be synchronous with host writes and/or garbage collection.

In some aspects, the controller 101 may set priorities dynamically for accelerator QPDs 208 based on at least one of the following: (i) accelerator data bandwidth requirements, (ii) multiple priorities for multiple accelerator QPDs in a die based on requesting client(s), (iii) storage state machine, such as failure, urgent relocation, and (iv) device power and thermal states when storage to compute ratio requirement changes. In some aspects, the controller 101 may determine the bandwidth requirements based on polling the accelerators 110 and/or the accelerators 110 may provide the controller 101 with the requirements ahead of compute operations. Different types of data or compute operations may require different data bandwidth; this may be the case even for same data in the memory 103, 103' or 103". Different accelerator tasks may have different timing requirements for accessing data. Moreover, the amount of data accessed may be limited (e.g., only a few kilobytes) but accessing the data in a timely manner may be required. One accelerator may be performing a video processing operation and another may be processing data for machine learning operations.

In some aspects, the priority of accelerator QPD 208 may be configured based on the power state or thermal state of the device 100. For example, when the device 100 determines that the thermal state is above a threshold, the controller 101 may deprioritize the accelerator QPD 208 allowing bare minimum storage functionality for housekeeping purposes. Thus, accelerator throttling may be enabled at low level by adjusting the priorities of the QPD(s). In some aspects, the throttling may be enabled when the queue(s) is (are) full (or almost full) and the queue entries are yet to be processed by the dies 103, 103' or 103".

The techniques described herein may be application agnostic. For example, in autonomous applications, there is a need for rapid telemetry data capture and analysis, a task that computational storage devices are uniquely positioned to solve. In some aspects, the controller firmware may include a telemetry QPD, and a suitable priority to enable continuous access to the telemetry data. The priority for a QPD corresponding to one accelerator may be adjusted relative to a QPD for other accelerators.

In some aspects, the device 100 may further manage the accelerator QPDs 208 in only some dies in the system based on what dies contribute to the logical blocks associated with one or more accelerators. For example, the controller 101 may not include some dies for accelerator logical blocks and may be used for only storage functionalities. In such cases, the QPD arrangement for the non-player dies may be similar to conventional systems. In FIG. 2A, for example, each of die 0, . . . die 7 is associated with a set of QPDs 210, each set 210 including a corresponding accelerator QPD 208, but a set of QPDs 220 associated with die 8 does not have a corresponding accelerator QPD 208. In this case, die 0, . . . die 7 (or accelerator tasks queued for these dies) may be managed using the accelerator QPD 208, but no accelerator tasks are queued for die 8 as die 8 is not associated with an accelerator QPD.

This is further illustrated in FIG. 2B, according to some aspects. In the example shown in FIG. 2B, suppose die 0, die 1, . . . , die 7 are accessed by an accelerator; hence, each die is associated with an accelerator QPD 208 within a corresponding set of QPDs 210. Further, suppose that the controller 101 receives a request to store data for this accelerator, the FTL of the controller 101 may form a logical block 212 across the dies 0 through 7. Suppose the request is to store 128 Kilobytes, the FTL of the controller 101 causes storing 32 KB in die 0, 32 KB in die 1, and so on. The FTL may access data for the accelerator from any of the dies 0 through 7. However, dies 8 through 31 do not store data for the accelerator, so there are no accelerator QPDs associated with these dies (i.e., dies 8 through 31). The accelerator QPDs 208 may be managed for one accelerator or may be used to queue tasks for more than one accelerator.

In some cases, one or more accelerators 110 may access data from the flash memory 103, 103' or 103" (or the NAND 108) at different bandwidths (e.g., 10-100 megabytes (MB) per second); the controller 101 may monitor data corresponding to each accelerator. In some aspects, the controller 101 may maintain a ratio of flash memory accesses consistent with the accelerator speeds. For example, if two accelerators make 1 MB data request, the final through put may be maintained according to how their QPDs are configured, which may be based on the bandwidth requirement of each accelerator.

Figure 3:
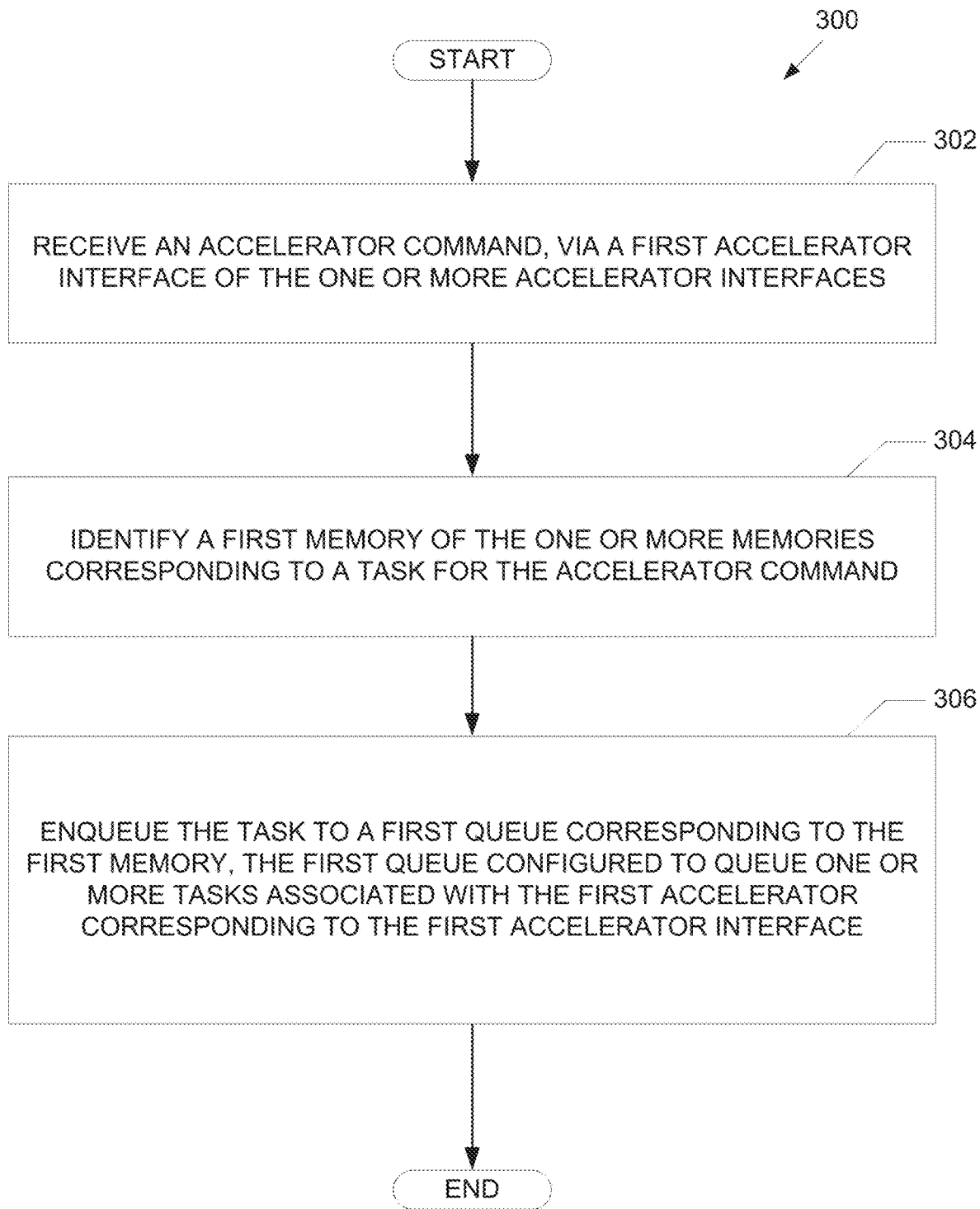
FIG. 3 shows a flowchart of an example process for using accelerator queues in a data storage device to handle commands from accelerators, according to one or more embodiments.

It may be instructive to describe the structures shown in FIGS. 1, 2A and 2B with respect to FIG. 3 which is a flowchart illustrating an example process 300 for using accelerator queues in a data storage device to handle commands from accelerators, according to some embodiments.

One or more blocks of FIG. 3 may be executed by a computing system (including, e.g., a controller 107 of a flash memory, a data storage controller 101 of a data storage system 100 or a solid-state storage device (SSD), a processor, or the like). Examples of a computing system or a controller may be the controller 101. Similarly, a non-transitory machine-readable medium may include machine-executable instructions thereon that, when executed by a computer or machine (e.g., the storage device 100 or its component(s)), perform the processes of FIG. 3.

The steps of process 300 may be implemented as hardware, firmware, software, or a combination thereof. The data storage device or system (e.g., the device 100) may include one or more accelerator interfaces 112. Each accelerator interface may couple a controller (e.g., the controller 101) to a respective accelerator of one or more accelerators (e.g., the accelerators 110). The storage device 100 includes a device memory comprising one or more memories (e.g., flash memories 103, 103' or 103"). The storage device 100 may include one or more sets of queues. These queues (e.g., queues 202, 204, 206 and/or 208) may reside, for example, in a RAM of the controller 101, in the storage medium 102, in the flash memory 103, 103' or 103", or in any memory external to the accelerators 110 in the device 100.

Each set of queues (e.g., 210 or 220) may correspond to a respective memory of the one or more memories (e.g., flash memories 103, 103' or 103") and include a respective plurality of queues (e.g., 202, 204, 206 and/or 208). For example, in FIG. 2A, one set of queues 210 (including 202, 204, 206 and 208) corresponds to die 0, another set of queues 210 (including 202, 204, 206 and 208) corresponds to die 1, and so on. At least one queue (e.g., the queue 208) is configured to queue one or more tasks associated with an accelerator of the one or more accelerators. Each queue (e.g., 202, 204, 206 or 208) of the one or more sets of queues may be associated with a respective priority level of a plurality of priority levels.

For example, a host queue 202 may be associated with a priority level of 0 (low priority), an RLC queue 204 may be associated a priority level of 1 (medium priority), an admin queue 206 may be associated with a priority level of 2 (medium priority), and an accelerator queue 208 may be associated with a priority level of 3 (high priority). These numbers are arbitrary and different controllers 101 may use different values or ranges for the priority levels. The priority levels may be determined based on a number of factors (including dynamic conditions).

In step 302, the controller 101 may receive an accelerator command, via a first accelerator interface of the one or more accelerator interfaces.

In step 304, the controller 101 may identify a first memory of the one or more memories corresponding to a task for the accelerator command. If there is only one queue for an accelerator, then any commands from that accelerator will always go to that queue, and thus this identification step may not be needed.

In step 306, the controller 101 may enqueue the task to a first queue corresponding to the first memory. The first queue may be configured to queue one or more tasks associated with the first accelerator corresponding to the first accelerator interface.

In some aspects, the controller 101 may determine a priority level for the first queue relative to other queues, based at least on a data rate requirement of the first accelerator. The first queue and the other queues are in the one or more sets of queues. For example, if the accelerator has a high bandwidth requirement, the controller 101 may temporarily assign a priority level of 3 (high priority) to that accelerator queue 208. In some aspects, the controller 101 may determine the priority level for the first queue relative to the other queues, further based on a state of the data storage device including failures or relocations. For example, the controller 101 may determine that there is a pending relocation operation, so the controller 101 may increase the priority level of the RLC queue 204 relative to other queues (e.g., the accelerator queue 208) for a die or for one or more dies.

In some aspects, the controller 101 may determine the priority level for the first queue relative to the other queues further based on power and thermal states of the data storage device. Some accelerator operations may overheat the device, for example, so the controller 101 may temporarily throttle requests from an accelerator by decreasing the priority level of the accelerator queue 208. In some aspects, the controller 101 may determine the priority level based on the power and thermal states based on changes to a storage to compute ratio requirement for the data storage device. In some aspects, the controller 101 may deprioritize the first queue (e.g., the accelerator queue 208) to allow minimum storage functionality for housekeeping, in accordance with a determination that the thermal state is above a predetermined threshold.

In some aspects, the controller 101 may determine the data rate requirement for the first accelerator based on historical data for data accesses from the first accelerator. For example, the controller 101 may store (e.g., in a RAM of the controller 101 or the storage medium 102) information related to and/or monitor data requests from an accelerator.

In some aspects, the controller 101 may receive the data rate requirement for the first accelerator from the first accelerator.

In some aspects, the controller 101 may compute the data rate requirement for the first accelerator based on capacity or performance characteristics of the first memory (e.g., die 0).

In some aspects, the data storage device 100 further includes a host interface (e.g., the interface 105) for coupling the data storage device to a host system. Each set of queues includes one or more queues (e.g., the host queue 202) that are configured to queue tasks associated with host commands received from the host system, via the host interface. The controller 101 may determine the priority level for the first queue further based on monitoring the one or more queues.

In some aspects, the one or more accelerator interfaces 112 includes at least two accelerator interfaces including the first accelerator interface coupling the controller to the first accelerator (e.g., accelerator 110-2) of the one or more accelerators and a second accelerator interface coupling the controller to a second accelerator (e.g., accelerator 110-4) of the one or more accelerators 110. The one or more sets of queues include a first set of queues. The first set of queues includes at least the first queue and a second queue configured to queue one or more tasks associated with the second accelerator. The controller is further configured to determine a priority level for the first queue relative to the second queue, based at least on a data rate requirement of the first accelerator and a data rate requirement of the second accelerator. For example, the accelerator 110-2 may have a higher data rate requirement than the accelerator 110-2, so the controller 101 may determine that a queue associated with the first accelerator 110-2 has a higher priority than a queue associated with the accelerator 110-4.

In some aspects, the one or more sets of queues includes a first set of queues that includes the first queue corresponding to the first memory and a second set of queues that includes a second queue corresponding to a second memory, the second queue configured to queue one or more tasks associated with the first accelerator corresponding to the first accelerator interface. The controller is further configured to determine a priority level for the first queue relative to the second queue, based at least on data accesses to the first memory and the second memory.

In some aspects, the controller 101 includes the one or more sets of queues (e.g., in a RAM of the controller).

In some aspects, the controller 101 is further configured to: associate a first set of queues of the one or more sets of queues with the first memory; associate a second set of queues of the one or more sets of queues with a second memory of the one or more memories; identify the second memory corresponding to a second task for the accelerator command; and enqueue the second task to a second queue of the second set of queues.

In some aspects, the controller 101 is further configured to: associate the first queue with a second memory of the one or more memories instead of the first memory. For example, the controller 101 may associate the accelerator QPD 208 associated with die 1 instead of die 0. It is noted that although FIG. 2A shows a same reference label for QPDs for different dies, the controller 101 may internally track or manage the QPDs using different reference identifiers, so associating and/or reassociating the QPDs with dies and/or accelerators may be performed by assigning different identifiers for the QPDs.

In some aspects, the controller 101 is further configured to associate the first queue with a second accelerator of the one or more accelerators instead of the first accelerator.

In some aspects, at least one set of queues of the one or more sets of queues excludes any queue configured to queue tasks associated with any of the one or more accelerators. For example, in FIG. 2A, the set of queues corresponding to die 8 does not include any queue for an accelerator.

In some aspects, the controller 101 and the one or more accelerators 110 are configured as components of a system-on-a-chip (SoC).

In some aspects, the controller 101 is further configured to prioritize only a subset of queues of the one or more sets of queues for a subset of the one or more memories.

Various example embodiments and aspects of the disclosure are described below for convenience. These are provided as examples, and do not limit the subject technology. Some of the examples described below are illustrated with respect to the figures disclosed herein simply for illustration purposes without limiting the scope of the subject technology.

One or more aspects of the subject technology provide a data storage device (e.g., the data storage system 100) that may include: one or more accelerator interfaces, each accelerator interface coupling a controller to a respective accelerator of one or more accelerators; a device memory comprising one or more memories; and one or more sets of queues, each set of queues corresponding to a respective memory of the one or more memories and including a respective plurality of queues, at least one queue configured to queue one or more tasks associated with an accelerator of the one or more accelerators, each queue of the one or more sets of queues associated with a respective priority level of a plurality of priority levels. The controller is configured to: receive an accelerator command, via a first accelerator interface of the one or more accelerator interfaces; identify a first memory of the one or more memories corresponding to a task for the accelerator command; and enqueue the task to a first queue corresponding to the first memory, the first queue configured to queue one or more tasks associated with the first accelerator corresponding to the first accelerator interface In some aspects, the controller is further configured to: determine a priority level for the first queue relative to other queues, based at least on a data rate requirement of the first accelerator. The first queue and the other queues are in the one or more sets of queues.

In some aspects, the controller is further configured to determine the priority level for the first queue relative to the other queues, further based on a state of the data storage device including failures or relocations.

In some aspects, the controller is further configured to determine the priority level for the first queue relative to the other queues further based on power and thermal states of the data storage device.

In some aspects, the controller is further configured to determine the priority level based on the power and thermal states based on changes to a storage to compute ratio requirement for the data storage device.

In some aspects, the controller is further configured to deprioritize the first queue to allow minimum storage functionality for housekeeping, in accordance with a determination that the thermal state is above a predetermined threshold.

In some aspects, the controller is further configured to determine the data rate requirement for the first accelerator based on historical data for data accesses from the first accelerator.

In some aspects, the controller is further configured to receive the data rate requirement for the first accelerator from the first accelerator.

In some aspects, the controller is further configured to compute the data rate requirement for the first accelerator based on capacity or performance characteristics of the first memory.

In some aspects, the data storage device further includes a host interface for coupling the data storage device to a host system, wherein each set of queues includes one or more queues configured to queue tasks associated with host commands received from the host system, via the host interface, and the controller is further configured to determine the priority level for the first queue further based on monitoring the one or more queues.

In some aspects, the one or more accelerator interfaces includes at least two accelerator interfaces including the first accelerator interface coupling the controller to the first accelerator of the one or more accelerators and a second accelerator interface coupling the controller to a second accelerator of the one or more accelerators; the one or more sets of queues include a first set of queues; the first set of queues includes at least the first queue and a second queue configured to queue one or more tasks associated with the second accelerator. The controller is further configured to determine a priority level for the first queue relative to the second queue, based at least on a data rate requirement of the first accelerator and a data rate requirement of the second accelerator.

In some aspects, the one or more sets of queues includes a first set of queues that includes the first queue corresponding to the first memory and a second set of queues that includes a second queue corresponding to a second memory, the second queue configured to queue one or more tasks associated with the first accelerator corresponding to the first accelerator interface. The controller is further configured to determine a priority level for the first queue relative to the second queue, based at least on data accesses to the first memory and the second memory.

In some aspects, the controller includes the one or more sets of queues.

In some aspects, the controller is further configured to: associate a first set of queues of the one or more sets of queues with the first memory; associate a second set of queues of the one or more sets of queues with a second memory of the one or more memories; identify the second memory corresponding to a second task for the accelerator command; and enqueue the second task to a second queue of the second set of queues.

In some aspects, the controller is further configured to: associate the first queue with a second memory of the one or more memories instead of the first memory.

In some aspects, the controller is further configured to associate the first queue with a second accelerator of the one or more accelerators instead of the first accelerator.

In some aspects, at least one set of queues of the one or more sets of queues excludes any queue configured to queue tasks associated with any of the one or more accelerators.

In some aspects, the controller and the one or more accelerators are configured as components of a system-on-a-chip (SoC).

In some aspects, the controller is further configured to prioritize only a subset of queues of the one or more sets of queues for a subset of the one or more memories.

In other aspects, a method is implemented using one or more controllers for one or more storage devices. The method may include: receiving an accelerator command, via a first accelerator interface of one or more accelerator interfaces. The first accelerator interface couples a controller of the one or more controllers to a first accelerator of one or more accelerators; identifying a first memory of one or more memories corresponding to a task for the accelerator command; and enqueuing the task to a first queue of a first set of queues corresponding to the first memory, the first queue configured to queue one or more tasks associated with the first accelerator corresponding to the first accelerator interface, wherein each queue of the first set of queues is associated with a respective priority level of a plurality of priority levels.

In further aspects, a system may include: means for receiving an accelerator command, via a first accelerator interface of one or more accelerator interfaces. The first accelerator interface couples a controller of the one or more controllers to a first accelerator of one or more accelerators; means for identifying a first memory of one or more memories corresponding to a task for the accelerator command; and means for enqueuing the task to a first queue of a first set of queues corresponding to the first memory, the first queue configured to queue one or more tasks associated with the first accelerator corresponding to the first accelerator interface. Each queue of the first set of queues is associated with a respective priority level of a plurality of priority levels.

Various implementations of the methods and systems may be used for accelerator support in storage devices. The techniques described herein may be used to reduce solid state drive (SSD) random access memory (RAM) footprint, and provide performance advantages that improve the functioning of the storage device or SSD.

In one or more aspects, a method includes one or more methods, operations or portions thereof described herein. In one or more aspects, an apparatus includes one or more memories and one or more processors, the one or more processors configured to cause performing one or more methods, operations or portions thereof described herein. In one or more aspects, an apparatus includes means adapted for performing one or more methods, operations or portions thereof described herein. In one or more aspects, a hardware apparatus includes circuits configured to perform one or more methods, operations or portions thereof described herein. In one or more aspects, an apparatus includes components operable to carry out one or more methods, operations or portions thereof described herein. In one or more aspects, a non-transitory machine-readable storage medium (e.g., one or more memories and/or one or more registers) store instructions that, when executed by one or more processors, cause one or more processors to perform one or more methods, operations or portions thereof described herein.

In some examples, to illustrate the interchangeability of hardware and software, items such as the various illustrative blocks, modules, components, methods, operations, instructions, and algorithms may have been described generally in terms of their functionality. In some examples, whether such functionality is implemented as hardware, software or a combination of hardware and software depends upon the particular application and design constraints imposed on the overall system. Skilled artisans may implement the described functionality in varying ways for each particular application.

Headings and subheadings, if any, are used for convenience only and do not limit the invention. The word "exemplary" is used to mean serving as an example or illustration. Any implementation described herein as an "example" is not necessarily to be construed as preferred or advantageous over other implementations. Relational terms such as first and second and the like may be used simply for ease of understanding without necessarily requiring or implying any actual relationship or order between elements or actions and without necessarily requiring or implying that they have different characteristics unless stated otherwise.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" and "at least one of A, B, or C" may refer to only A, only B, or only C; any combination of A, B, and C; and/or at least one of each of A, B, and C.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the terms "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order, with the exception of steps and/or operations necessarily occurring in a particular order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In describing a temporal relationship, when the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

In one or more examples, when an element is "connected" or "coupled" to another element, the element can be directly connected or coupled to another element, and can be indirectly connected or coupled to another element with one or more intervening elements disposed or interposed between the elements, unless otherwise specified.

The disclosure is provided to enable any person skilled in the art to practice the various aspects described herein. In some instances, when a detailed description of well-known functions or configurations may unnecessarily obscure aspects of the present disclosure, the detailed description thereof may be omitted. The disclosure provides various examples of the subject technology, and the subject technology is not limited to these examples. Various modifications to these aspects will be readily apparent to those skilled in the art, and the principles described herein may be applied to other aspects.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

The shapes, sizes, areas, ratios, numbers, and the like disclosed in the drawings for describing implementations of the present disclosure are merely examples, and thus, the present disclosure is not limited to the illustrated details.

When the term "comprise," "have," "include," "contain," "constitute," or the like is used, one or more other elements may be added unless a term such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. An element proceeded by "a," "an," "the," or "said" does not, without further constraints, preclude the existence of additional elements.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, or the like). Furthermore, while the subject disclosure may provide many example ranges and values, these are non-limiting examples, and other ranges and values are within the scope of the subject technology.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A data storage device, comprising:
   one or more accelerator interfaces, each accelerator interface coupling a controller to a respective accelerator of one or more accelerators;
   a device memory comprising one or more memories; and
   one or more sets of queues, each set of queues corresponding to a respective memory of the one or more memories of the device memory and including a respective plurality of queues, at least one queue configured to queue one or more tasks associated with an accelerator of the one or more accelerators, each queue of the one or more sets of queues associated with a respective priority level of a plurality of priority levels, wherein the controller is configured to:
      receive an accelerator command, via a first accelerator interface of the one or more accelerator interfaces;
      identify a first memory of the one or more memories of the device memory corresponding to a task for the received accelerator command;
      enqueue the task to a first queue corresponding to the first memory of the one or more memories of the device memory, the first queue configured to queue one or more tasks associated with a first accelerator corresponding to the first accelerator interface; and
      prioritize only a subset of queues of the one or more sets of queues for a subset of the one or more memories of the device memory.

2. The data storage device of claim 1, wherein:
   the controller is further configured to:
      determine a priority level for the first queue relative to other queues, based at least on a data rate requirement of the first accelerator; and
   the first queue and the other queues are in the one or more sets of queues.

3. The data storage device of claim 2, wherein the controller is further configured to:
   determine the priority level for the first queue relative to the other queues, further based on a state of the data storage device including failures or relocations.

4. The data storage device of claim 2, wherein the controller is further configured to:
   determine the priority level for the first queue relative to the other queues further based on power and a thermal state of the data storage device.

5. The data storage device of claim 4, wherein the controller is further configured to:
   determine the priority level based on the power and the thermal state based on changes to a storage to compute ratio requirement for the data storage device.

6. The data storage device of claim 4, wherein the controller is further configured to:
   deprioritize the first queue to allow minimum storage functionality for housekeeping, in accordance with a determination that the thermal state is above a predetermined threshold.

7. The data storage device of claim 2, wherein the controller is further configured to:
   determine the data rate requirement for the first accelerator based on historical data for data accesses from the first accelerator.

8. The data storage device of claim 2, wherein the controller is further configured to:
   receive the data rate requirement for the first accelerator from the first accelerator.

9. The data storage device of claim 2, wherein the controller is further configured to:
   compute the data rate requirement for the first accelerator based on capacity or performance characteristics of the first memory.

10. The data storage device of claim 2, further comprising a host interface for coupling the data storage device to a host system, wherein each set of queues includes one or more queues configured to queue tasks associated with host commands received from the host system, via the host interface, and wherein the controller is further configured to determine the priority level for the first queue further based on monitoring the one or more queues.

11. The data storage device of claim 1, wherein:
   the one or more accelerator interfaces comprises at least two accelerator interfaces including the first accelerator interface coupling the controller to the first accelerator of the one or more accelerators and a second accelerator interface coupling the controller to a second accelerator of the one or more accelerators;
the one or more sets of queues comprise a first set of queues;
the first set of queues comprises at least the first queue and a second queue configured to queue one or more tasks associated with the second accelerator; and
the controller is further configured to determine a priority level for the first queue relative to the second queue, based at least on a data rate requirement of the first accelerator and a data rate requirement of the second accelerator.

12. The data storage device of claim 1, wherein:
the one or more sets of queues includes a first set of queues that includes the first queue corresponding to the first memory and a second set of queues that includes a second queue corresponding to a second memory, the second queue configured to queue one or more tasks associated with the first accelerator corresponding to the first accelerator interface; and
the controller is further configured to determine a priority level for the first queue relative to the second queue, based at least on data accesses to the first memory and the second memory.

13. The data storage device of claim 1, wherein the controller includes the one or more sets of queues.

14. The data storage device of claim 1, wherein the controller is further configured to:
associate a first set of queues of the one or more sets of queues with the first memory;
associate a second set of queues of the one or more sets of queues with a second memory of the one or more memories;
identify the second memory corresponding to a second task for the received accelerator command; and
enqueue the second task to a second queue of the second set of queues.

15. The data storage device of claim 1, wherein the controller is further configured to:
associate the first queue with a second memory of the one or more memories instead of the first memory.

16. The data storage device of claim 1, wherein at least one set of queues of the one or more sets of queues excludes any queue configured to queue tasks associated with any of the one or more accelerators.

17. A method implemented using one or more controllers for one or more storage devices, the method comprising:
receiving an accelerator command, via a first accelerator interface of one or more accelerator interfaces, wherein the first accelerator interface couples a controller of the one or more controllers to a first accelerator of one or more accelerators;
identifying a first memory of one or more memories corresponding to a task for the received accelerator command;
enqueuing the task to a first queue of a first set of queues corresponding to the first memory, the first queue configured to queue one or more tasks associated with the first accelerator corresponding to the first accelerator interface, wherein each queue of the first set of queues is associated with a respective priority level of a plurality of priority levels; and
associating the first queue with a second accelerator of the one or more accelerators instead of the first accelerator.

18. The method of claim 17, further comprising:
prioritizing only a subset of queues of one or more sets of queues for a subset of the one or more memories.

19. A system, comprising:
means for receiving an accelerator command, via a first accelerator interface of one or more accelerator interfaces, wherein the first accelerator interface couples a controller of the one or more controllers to a first accelerator of one or more accelerators;
means for identifying a first memory of one or more memories corresponding to a task for the received accelerator command;
means for enqueuing the task to a first queue of a first set of queues corresponding to the first memory, the first queue configured to queue one or more tasks associated with the first accelerator corresponding to the first accelerator interface, wherein each queue of the first set of queues is associated with a respective priority level of a plurality of priority levels; and
means for prioritizing only a subset of queues of one or more sets of queues for a subset of the one or more memories.

* * * * *